United States Patent
Ikeda

(10) Patent No.: US 9,716,889 B2
(45) Date of Patent: Jul. 25, 2017

(54) INTRA AND INTER-COLOR PREDICTION FOR BAYER IMAGE CODING

(71) Applicant: SONY CORPORATION, Tokyo (JP)

(72) Inventor: Masaru Ikeda, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 14/565,218

(22) Filed: Dec. 9, 2014

(65) Prior Publication Data
US 2016/0165236 A1 Jun. 9, 2016

(51) Int. Cl.
H04N 11/02 (2006.01)
H04N 11/04 (2006.01)
H04N 7/12 (2006.01)
H04N 19/159 (2014.01)
H04N 19/14 (2014.01)
H04N 19/186 (2014.01)

(52) U.S. Cl.
CPC ........... *H04N 19/159* (2014.11); *H04N 19/14* (2014.11); *H04N 19/186* (2014.11)

(58) Field of Classification Search
CPC .................................................. H04N 19/159
USPC ...................................................... 375/240.13
See application file for complete search history.

(56) References Cited

U.S. PATENT DOCUMENTS

| 6,744,929 | B1 | 6/2004 | Okada | |
|---|---|---|---|---|
| 8,315,469 | B2 | 11/2012 | Kalevo | |
| 2002/0071485 | A1* | 6/2002 | Caglar | H04N 21/23406 375/240.01 |
| 2005/0152610 | A1* | 7/2005 | Hagiwara | H04N 1/4105 382/239 |
| 2009/0003717 | A1* | 1/2009 | Sekiguchi | H04N 19/176 382/238 |
| 2012/0224640 | A1* | 9/2012 | Sole Rojals | H04N 19/124 375/240.18 |
| 2012/0294513 | A1 | 11/2012 | Chida | |
| 2013/0251023 | A1 | 9/2013 | Sung | |
| 2014/0092957 | A1 | 4/2014 | MacInnis | |
| 2014/0098268 | A1* | 4/2014 | Mochizuki | H04N 9/045 348/277 |

(Continued)

FOREIGN PATENT DOCUMENTS

TW 201412122 A 3/2014

OTHER PUBLICATIONS

United States Patent and Trademark Office (USPTO), International Search Report and Written Opinion, PCT/US2015/057843, Oct. 28, 2015 (pp. 1-9) with claims searched (pp. 10-13), counterpart to U.S. Appl. No. 14/565,218 hereon.

(Continued)

*Primary Examiner* — Jorge L Ortiz Criado
*Assistant Examiner* — Amir Shahnami
(74) *Attorney, Agent, or Firm* — O'Banion & Ritchey LLP; John P. O'Banion

(57) ABSTRACT

An apparatus and method for selecting the use of inter-prediction or intra-prediction during enhanced encoding and decoding of Bayer images. Intra-plane predictions rely on correlation between neighboring pixels of the same color, while inter-plane predictions rely on correlation between neighboring pixels in different color planes (i.e., different colors). A dynamic range decision is made to select whether to use the intra-plane or inter-plane prediction, towards eliminating large residuals which can arise in certain large edge situations.

20 Claims, 10 Drawing Sheets

(56) References Cited

U.S. PATENT DOCUMENTS

| | | | |
|---|---|---|---|
| 2014/0241418 A1* | 8/2014 | Garbas | H04N 19/00042 375/240.02 |
| 2014/0267890 A1 | 9/2014 | Lelescu | |
| 2015/0201200 A1 | 7/2015 | Cheong | |

OTHER PUBLICATIONS

Taiwan Intellectual Property Office, Official Action dated Nov. 16, 2016, related Taiwan Patent Application No. 104140318, pp. 1-13, English-language translation, pp. 14-24, with claims examined, pp. 25-28.

* cited by examiner

INTRA AND INTER-COLOR PREDICTION FOR BAYER IMAGE CODING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This disclosure pertains generally to using inter-color prediction during Bayer image encoding, and more particularly for selecting intra-color or inter-color prediction for Bayer coding systems in response to a dynamic range decision.

2. Background Discussion

Numerous color camera systems (e.g., digital cameras, camcorders, and scanners) utilizing single-chip digital image sensors make use of a Bayer filter mosaic including a color filter array (CFA) for arranging RGB color filters on/over a grid of photosensors. There are a number of types of Bayer filter mosaics in use. In one example, a (Bayer) arrangement of color filters, having 50% green, 25% red and 25% blue, is utilized to create a color image, and is alternately referred to as RGBG, GRGB, or RGGB. It should be appreciated that since the human eye is more sensitive to green there are more green pixels because more content in the green portion of the spectrum enhances image appearance.

Bayer color images are typically encoded with only 8-bit resolution, as opposed to the typical 24-bit (RGB) representation. By assigning each pixel either a Red, Blue, or one of two Green values (i.e., Gr, Gb), one can then utilize the color information in the vicinity of each pixel to specify the actual color for that pixel, or assign colors for that pixel group. Bayer encoding utilizes a color mosaic in which the colors alternate so that the colors in a neighborhood can be used to determine the value for each color component of the pixel in question.

FIG. 1 depicts a Bayer color mosaic, showing a total of 8 pixel groups, $R_1$, $B_1$, $Gr_1$, $Gb_1$, through to $R_8$, $B_8$, $Gr_8$, $Gb_8$.

It can be seen that every position has a particular color component and is surrounded by at least two of each of the other color values. It will be noted that one type of Bayer image has four color planes (1) R-plane, (2) Gr-plane, (3) Gb-plane, and (4) B-plane. References to image "planes" in Bayer encoding refer to a "color-plane". There are a number of variations of Bayer color encoding, which are applicable to the present disclosure.

Typically, residuals are generated for these pixels based on a difference between the pixel and an average of neighboring pixels of the same color. Generally, the averaging process in Bayer encoding exploits spatial correlation within the same color, and is referred to as intra-plane correlation. This averaging takes into account that closely neighboring samples with the same color tend to have more similar values compared to distant samples. For example, it is more likely that $|R_1-R_2|<|R_1-R_4|$.

In a prior application by the applicant, enhanced prediction was performed utilizing inter-prediction during Bayer color encoding to increase encoding efficiency to enhance intra-plane correlations.

The present technology further extends Bayer coding benefits in selecting whether to perform inter or intra-prediction.

BRIEF SUMMARY

Benefits have been shown from using inter-plane correlations to enhance intra-plane correlations for Bayer image encoding. However, in certain instances, such as in response to very large color edges, inter-color prediction does not always provide optimum results. For example, in situations where a large spatial edge exists, the residual becomes unworkably large.

The present disclosure provides dynamic range (DR) dependent decisions into the prediction process to overcome the shortcomings of previous Bayer image coding systems. In particular, the disclosure teaches an apparatus and method for deciding (or switching) either intra-color prediction and inter-color prediction using DR dependent methods, and more particularly how to combine those predictions.

Further aspects of the disclosed technology will be brought out in the following portions of the specification, wherein the detailed description is for the purpose of fully disclosing preferred embodiments without placing limitations thereon.

BRIEF DESCRIPTION OF THE SEVERAL VIEWS OF THE DRAWING(S)

The technology will be more fully understood by reference to the following drawings which are for illustrative purposes only:

DETAILED DESCRIPTION

The present technology is motivated by a realization that inter-plane correlation exists within Bayer images as well as intra-plane correlation. That is to say, that not only correlations of adjacent pixels of the same color (intra-plane) have significance, but also correlations exist with other colors (inter-plane) within the Bayer image. Additional inter-plane correlations are performed according to the present technology to enhance Bayer image encoding toward compressing the color image data more efficiently. These inter-plane predictions are then selected in response to making a dynamic range decision, and/or exclusion, toward preventing the generation of large residuals when certain edge situations arise.

Figures 1, 2:
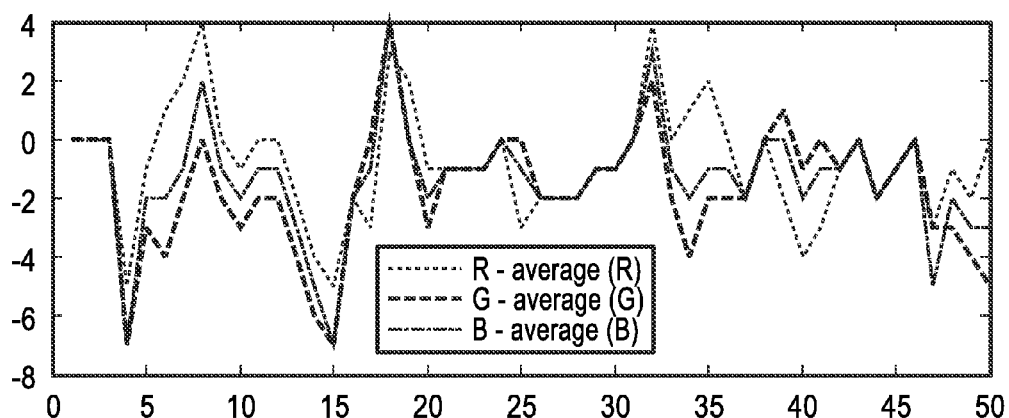
FIG. 1 is an example of Bayer color pixel arrangements showing eight pixel groups.
FIG. 2 is a plot of inter-plane correlations (across colors) indicating a basis for augmenting intra-plane prediction with inter-plane prediction.

FIG. 2 depicts a plot of inter-plane correlations. Fluctuations about the zero value are shown in response to computing R—average(R), G—average(G), and B—average(B) within a given block. The x-axis of the plot depicts spatial pixel position in a single row. The figure shows that even though R, G, B have typically very different values, their spatial change (or variation or fluctuation) is correlated across different colors. Toward clearly depicting this situation in the single plot of FIG. 2, the color mean was subtracted from each color across the range of pixels.

It will be seen that these inter-plane correlations (across different colors), exist because spatial value changes and/or fluctuations tend to be similar for each of the colors R, Gr, Gb, and B. For example, if $R_1 < R_2$, it is also likely this general color relation is similar for the other colors, for example $B_1 < B_2$, $Gr_1 < Gr_2$, and $Gb_1 < Gb_2$. The plot indicates the basis upon which the present technology for augmenting intra-plane prediction with inter-plane prediction has merit.

By way of example and not limitation, in the following descriptions, the disclosed method is implemented for 8×1 random access coding, an example of an 8×1 block is $R_1$, $Gr_1$, $R_2$, $Gr_2$, $R_3$, $Gr_3$, $R_4$, $Gr_4$ from FIG. 1.

Figure 3:
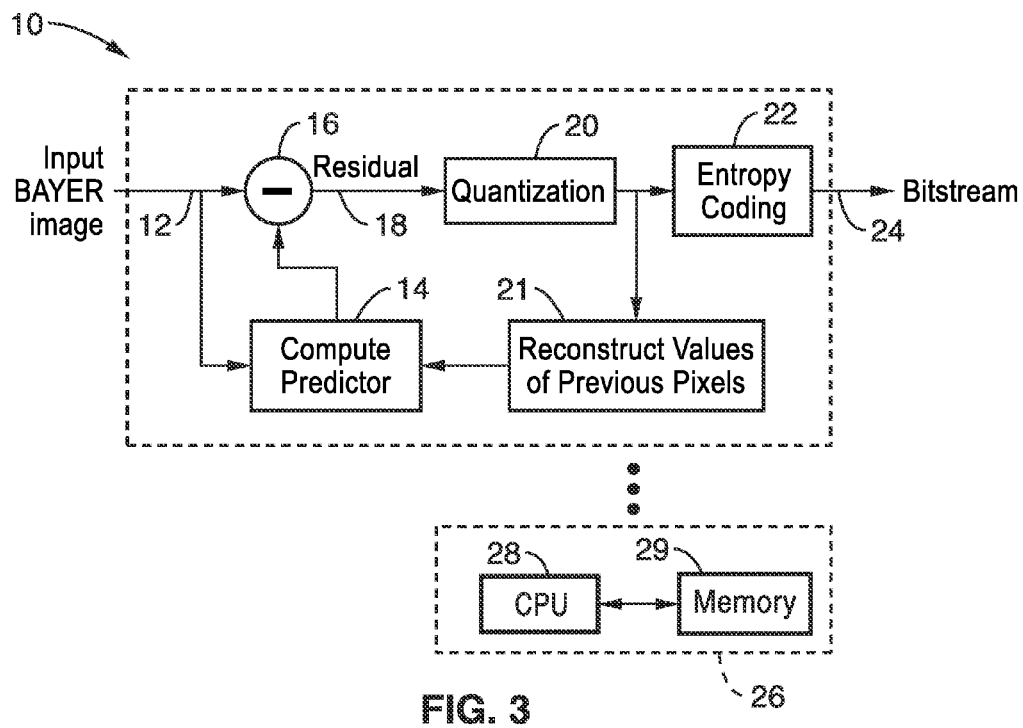
FIG. 3 is a block diagram of a first Bayer encoder embodiment utilized according to an embodiment of the presented technology.
Figure 4:
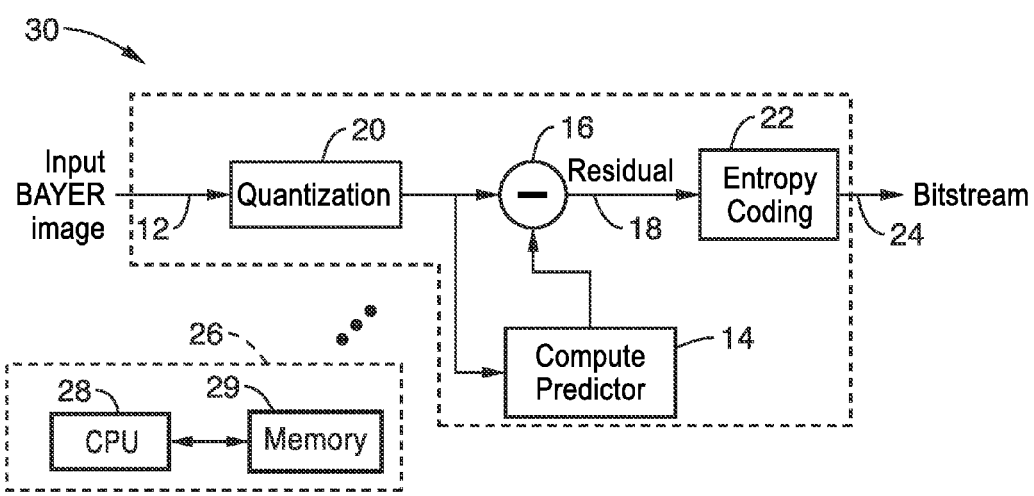
FIG. 4 is a block diagram of a second Bayer encoder embodiment utilized according to an embodiment of the presented technology.

FIG. 3 and FIG. 4 illustrate example embodiments 10, 30 of Bayer encoders which can be utilized according to methods for exploiting inter-plane correlations during encoding, such as by entropy coding utilizing differential pulse code modulation (DPCM), or a combination of pulse code modulation (PCM) and DPCM. It should be appreciated that embodiments 10, 30 are provided by way of example and not limitation, as the present technology can be practiced on other encoder configurations without departing from the teachings of the present technology.

In FIG. 3, a Bayer image is input 12, to which a predictor is determined 14, utilizing reconstructed values 21 from previous pixels, and a difference determined at sum junction 16 to produce residual 18 (i.e., a positive or negative value) which is quantized 20 and then entropy coded 22 to produce bitstream output 24. It will be noted that in the process of quantization 20, some information is lost, whereby the predictor 14 must be determined based on the reconstructed value after quantization.

The encoding process is seen being performed by a processing means 26 including at least one computer processor 28, such as a central processor unit (CPU or GPU), microprocessor, microcontroller, DSP, programmable array devices, or similar devices configured for programmed or programmable execution in performing blocks 14 through 22. Processing means 26 is also shown with at least one memory 29, such as for storing data and programming for processor 28. The memory may include solid state memory and other computer-readable media. The present technology is non-limiting with regard to memory and computer-readable media, insofar as these are non-transitory, and thus not constituting a transitory electronic signal.

In FIG. 4, a Bayer image is input 12 and quantized 20, after which a predictor is determined 14, and a difference output at sum junction 16 to produce a residual 18 which is entropy coded 22 to produce bitstream output 24. Embodiment 30 preferably utilizes the same processing means 26 including at least one computer processor 28 and at least one memory 29, as described in regard to FIG. 3.

The following section describes two different mechanisms (methods) for performing prediction according to the present technology. It should be noted that either of these may be utilized in the step of computing predictor 14 exemplified in FIG. 3 and FIG. 4, or with other coding arrangements that generate a residual based on computing a difference with a predictor.

In a first prediction method, inter-plane prediction is performed at the same time as the intra-plane prediction. It will be recognized that intra-plane prediction is performed and residuals generated according to the following:

$$\Delta R_n = R_n - SP(R_n),$$

$$\Delta Gr_n = Gr_n - SP(Gr_n),$$

$$\Delta Gb_n = Gb_n - SP(Gb_n), \text{ and}$$

$$\Delta B_n = B_n - SP(B_n).$$

In the above equations, "SP" represents performing a spatial prediction based on pixels in the same color plane, that is to say, prediction is performed in response to pixels of the same color which are in the vicinity (e.g., direct neighbors, or to a lesser extent, indirect neighbors). However, according to this method, these predictions are modified by inter-plane prediction incorporated into one or more of these color predictions, whereby the prediction is performed based on a combination of the same plane and different planes.

An example of this first method of prediction is described below in which a combination of intra-prediction and inter-prediction is performed on the green colors, while red and blue are only subject to intra-prediction. Residuals for colors $R_n$, $Gr_n$, $Gb_n$, $B_n$, are determined as $\Delta R_n$, $\Delta Gr_n$, $\Delta Gb_n$, $\Delta B_n$, from predictions determined as follows:

$$\Delta R_n = R_n - SP(R_n)$$

$$\Delta Gr_n = Gr_n - SP(Gr_n) + R_n - SP(R_n)$$

$$\Delta Gb_n = Gb_n - SP(Gb_n) + B_n - SP(B_n)$$

$$\Delta B_n = B_n - SP(B_n)$$

It should be appreciated that many variations of the above generalized method can be implemented without departing from the present technology. For example, inter-plane prediction can be performed for other colors (red and blue instead of the green, or another combination of the colors), or the red and blue inter-predictive components can be swapped in relation to Gr and Gb in some instances, or additional inter-prediction added, such as being based on more distant pixels, just to name a few examples applicable to the present technology.

In the above description, $SP(X_n)$ means "spatial predictor" of color X in pixel group n. The spatial predictor refers to the use of any desired intra-plane prediction process for a given color pixel in the given pixel group. It is seen above that the red pixel and the blue pixel are predicted only in response to their spatial prediction of the same color, while green pixel prediction includes an inter-plane prediction component which includes a red and blue residual. It should be noted that R and B are preferably differentiated from Gr and Gb, because the green colors typically have a higher fluctuation than red and blue colors, whereby incorporation of inter-plane prediction results in greater stability and accuracy of the green colors to provide the most benefit.

In the second prediction method, inter-plane prediction is performed at a different residual computation level than the intra-plane prediction. By way of example, inter-plane prediction is performed within a second level of residual computation following computing residuals for intra-plane prediction. According to this method, at least one computation level is performed which includes inter-plane prediction, across the color planes, for one or more of the colors R, Gr, Gb, or B.

In a first step, for each color, an intra-color spatial prediction residual is determined in at least one level of computation:

$$\Delta R_n = R_n - SP(R_n)$$

$$\Delta Gr_n = Gr_n - SP(Gr_n)$$

$$\Delta Gb_n = Gb_n - SP(Gb_n)$$

$$\Delta B_n = B_n - SP(B_n)$$

In the above equations, $SP(X_n)$ again means "spatial predictor" of color X in pixel group n. Example of these spatial predictors (1D or 2D blocks) include: $SP(X_6) = X_5$, $SP(X_6) = X_2$, $SP(X_6) = X_5 + X_2 - X_1$, and so forth. It will be appreciated that $X_n$ needs to be predicted from a neighboring pixel $X_m$, that may be found in any desired direction (e.g., above, left, right, and below) when considering a 2D block, or left or right in a 1D block. However, prediction is preferably performed in relation to neighboring pixels that have already been coded. So for example, in a 1D block (e.g., 8×1), there may be only one preferred choice of a left-side neighbor (e.g., $X_{n-1}$), which has already been coded and can be utilized.

In a second step, spatial prediction residuals are again predicted from neighboring spatial prediction residuals for at least a portion of the colors, exemplified as follows:

$$\Delta\Delta Gr_n = \Delta Gr_n - \Delta R_n$$

$$\Delta\Delta Gb_n = \Delta Gb_n - \Delta B_{n-1}$$

These residuals are then entropy encoded along with $\Delta R_n$ and $\Delta B_n$ from the first level of residual computation, to produce the encoded bitstream.

An alternate implementation of the second step computes residuals for all colors, exemplified as follows:

$$\Delta\Delta R_n = \Delta R_n - \Delta Gr_{n-1}$$

$$\Delta\Delta Gr_n = \Delta Gr_n - \Delta R_n$$

$$\Delta\Delta Gb_n = \Delta Gb_n - \Delta B_{n-1}$$

$$\Delta\Delta B_n = \Delta B_n - \Delta Gb_n$$

It should be noted that the $1^{st}$ and $3^{rd}$ lines above have an index n−1, instead of an index of n, toward utilizing information about pixels which have already been coded. In certain applications or configurations, pixels from other directions can be alternatively or additionally utilized as well when computing this next level of residuals.

The decision on the direction of available pixels to utilize is easiest to understand when considering the decoder side. It will be seen that the decoder can first compute $\Delta R_n$ but doesn't have information $\Delta Gr_n$ yet, so the decoder can't use $\Delta Gr_n$ to compute $\Delta\Delta R_n$. Thus, in computing $\Delta\Delta R_n$, the decoder relies on $\Delta R_n$ and $\Delta Gr_{n-1}$. However, when the decoder decodes $Gr_n$, it can compute $\Delta Gr_n$ and also $\Delta R_n$. So when computing $\Delta\Delta Gr_n$, the decoder uses $\Delta Gr_n$ and $\Delta R_n$.

Finally, the above residuals ($\Delta\Delta R_n$, $\Delta\Delta Gr_n$, $\Delta\Delta Gb_n$, $\Delta\Delta B_n$) are entropy coded into an entropy encoded Bayer bitstream. It should be appreciated that except for the first few samples, for which previous spatial prediction residual values are unavailable (which are PCM coded), the rest of the samples are preferably DPCM coded using both intra-color and inter-color neighboring samples.

It will be noted that in the 1D implementation, inter-color predictor is the left neighboring sample's spatial prediction residual. However, the present technology is not limited in that regard, as predictor position can be selected according to different implementations and applications.

It should be appreciated that the method can be utilized for both "non-random access" and "random access" conditions. In "random access" conditions, when encoding a given block, the encoder and decoder do not need access to other blocks. This means that the decoder can still decode any given block without having to know information of the other blocks. In contrast to this, under "non-random access" conditions, the ability is needed to access other blocks, such as neighboring blocks, as the predictor is computed based on pixels of the other blocks. This means that the decoder can only decode a given block in random access conditions if the decoder can access other blocks.

Test results from both the single and multiple level residual computation methods indicate a significant improvement in peak signal-to-noise ratio (PSNR) (e.g., greater than 1 dB), when including inter-plane prediction. In testing these embodiments, the left sample of the same color is used as a predictor for spatial prediction. In addition, during testing, the 1D 8×1 block was utilized. It should be appreciated that higher gains can be expected for larger blocks and for 2D blocks.

It should be appreciated that the above inter-plane prediction elements of the present technology should not be confused with the wholly different process of color weighting. Color weighting is performed for correcting colors using fixed offsets, based on parametric measurements of a given model of color imager (e.g., charge-coupled device (CCD)), toward remediating fixed levels of color offsets and bleeding.

Figure 5:
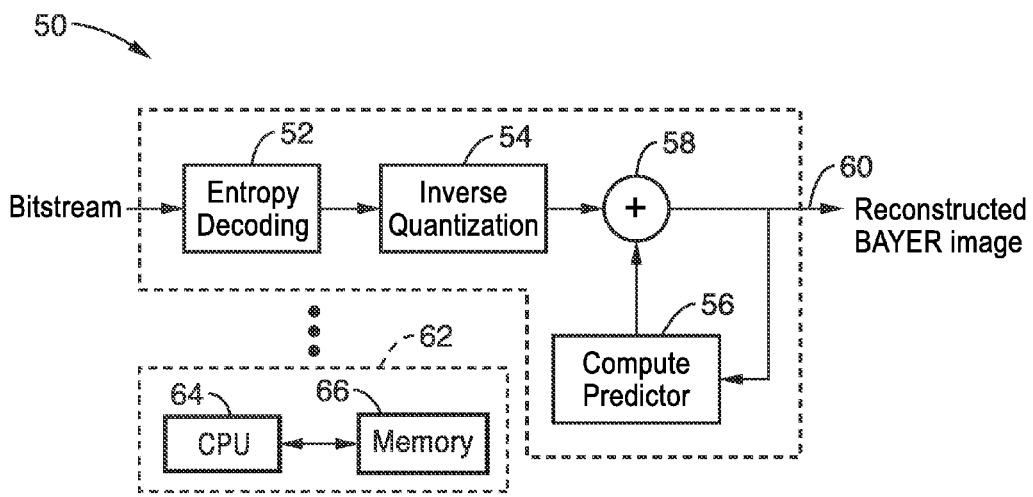
FIG. 5 is a block diagram of a first Bayer decoder embodiment utilized according to an embodiment of the presented technology.
Figure 6:
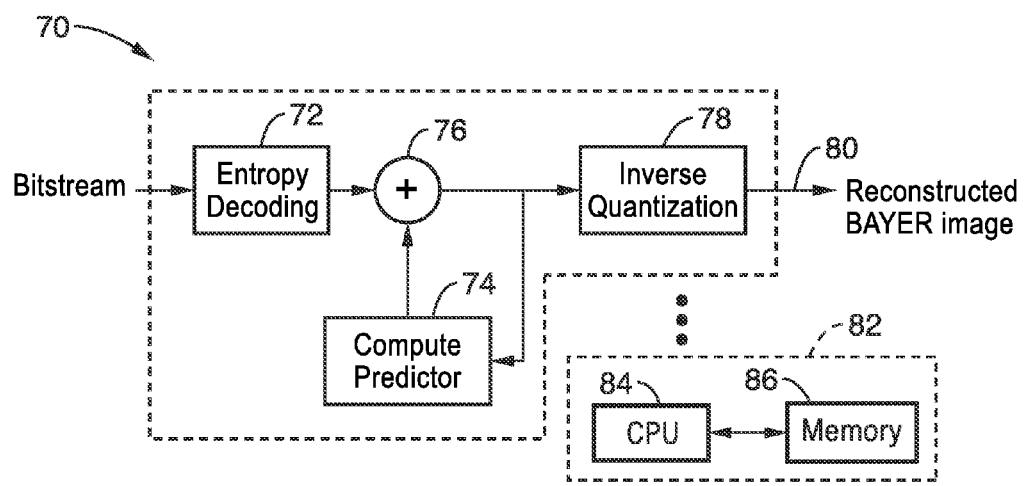
FIG. 6 is a block diagram of a second Bayer decoder embodiment utilized, according to an embodiment of the presented technology.

FIG. 5 and FIG. 6 illustrate example embodiments 50, 70 of Bayer decoders, which are counterparts of the encoders shown in FIG. 3 and FIG. 4, respectively, for exploiting inter-plane correlations during decoding, such as by decoding a bitstream which was entropy coded utilizing differential pulse code modulation (DPCM), or a combination of pulse code modulation (PCM) and DPCM. It should be appreciated that embodiments 50, 70 are provided by way of example and not limitation, as the present technology can be practiced on other decoder configurations without departing from the teachings of the present technology.

In FIG. 5, an encoded bitstream is received for entropy decoding 52 followed by inverse quantization 54, with a sum determined 58 at a sum junction in response to a computed predictor 56. The summed output 60 being a reconstruction of the original Bayer input image. It will be appreciated that prediction can be performed on this decoder in the same manner as described for the encoders of FIG. 3 and FIG. 4.

The decoding process is seen being performed by a processing means 62 including at least one computer processor 64, such as a central processor unit (CPU or GPU), microprocessor, microcontroller, DSP, programmable array devices, or similar devices configured for programmed or programmable execution in performing blocks 52 through 58. Processing means 62 is also shown with at least one memory 66, such as for storing data and programming for processor 64. The memory may include solid state memory and other computer-readable media. The present technology is non-limiting with regard to memory and computer-readable media, insofar as these are non-transitory, and thus not constituting a transitory electronic signal.

In FIG. 6, an encoded bitstream is received for entropy decoding 72 followed summing 76 at a sum junction in response to a computed predictor 74, after which inverse quantization 78 is performed to generate a reconstruction of the original Bayer input image 80. It will be appreciated that prediction can be performed on this decoder in the same manner as described for the encoders of FIG. 3 and FIG. 4. Embodiment 70 preferably utilizes a similar processing means 82 including at least one computer processor 84 and at least one memory 86, as described in regard to the decoder of FIG. 5.

The following sections describe improvements to the inter- and intra-color prediction for this Bayer image coding mechanism, which overcome certain prediction issues. In particular, in situations in which a large spatial edge exists, wherein either intra-color prediction or inter-color prediction fails to provide a good prediction. Rather than describing each dynamic range case between R, Gr, Gb and B, the following generically describes these differences as between simply two types of values, A and B. It will be appreciated that these are applicable to R, Gr, Gb and B and similar pixel color configurations, without limitation.

Figure 7A:
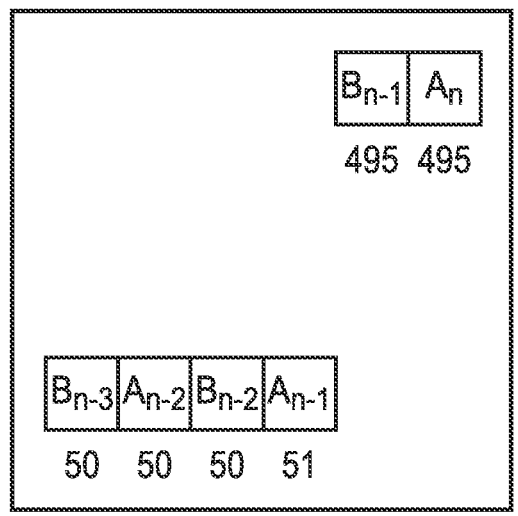
FIG. 7A and FIG. 7B are pixel sample examples of edge conditions within a portion of a Bayer color image, from which high residual values can arise for inter-prediction, as utilized according to embodiments of the presented technology.
Figure 7B:
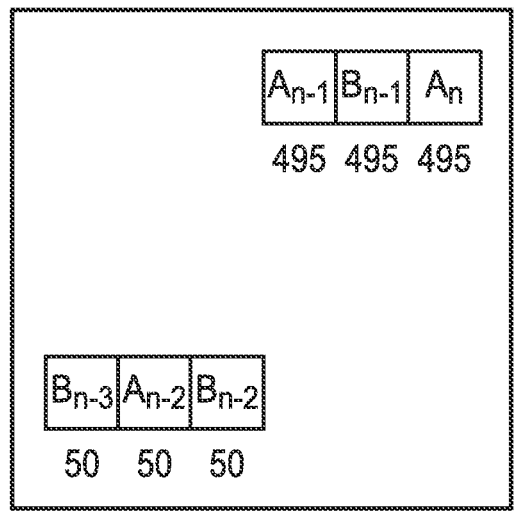

FIG. 7A and FIG. 7B illustrate example cases of a large spatial edge which can throw off either of the above predictions. From FIG. 7A, one can see intra-prediction: $\Delta A_n = A_n - SP(A_n) = 495 - 51 = 444$, in which a large residual is generated. A similar situation for inter-prediction is shown in FIG. 7B. It should be appreciated that rather than describing each dynamic range case between R, Gr, Gb and B, these figures and residual equations generalize the differences as simply between two types of values, A and B. The teachings are applicable to all R, Gr, Gb and B and similar Bayer type pixel color configurations, without limitation:

$$\Delta A_n = A_n - SP(A_n) = 495 - 495 = 0$$

$$\Delta B_n = B_n - SP(B_n) = 495 - 50 = 445$$

$$\Delta \Delta A_n = \Delta A_n - \Delta B_{n-1} = 0 - 445 = -445$$

In the above equations, the differences on the same color are small (0), but are large between colors. So certain exception cases exist for both intra-color and inter-color, in which the prediction residuals becomes quite large.

The following describes sample grouping code words and dynamic range decision mechanisms for overcoming the above situations. It will be appreciated that dynamic range is the property in which the range (difference) between two values is compared against some criterion.

FIG. 8 through FIG. 15B illustrate two different example embodiments and variations for selecting between inter-color prediction and intra-color prediction based on a dynamic range decision used separately or in combination with a dynamic range exclusion.

Figure 8:
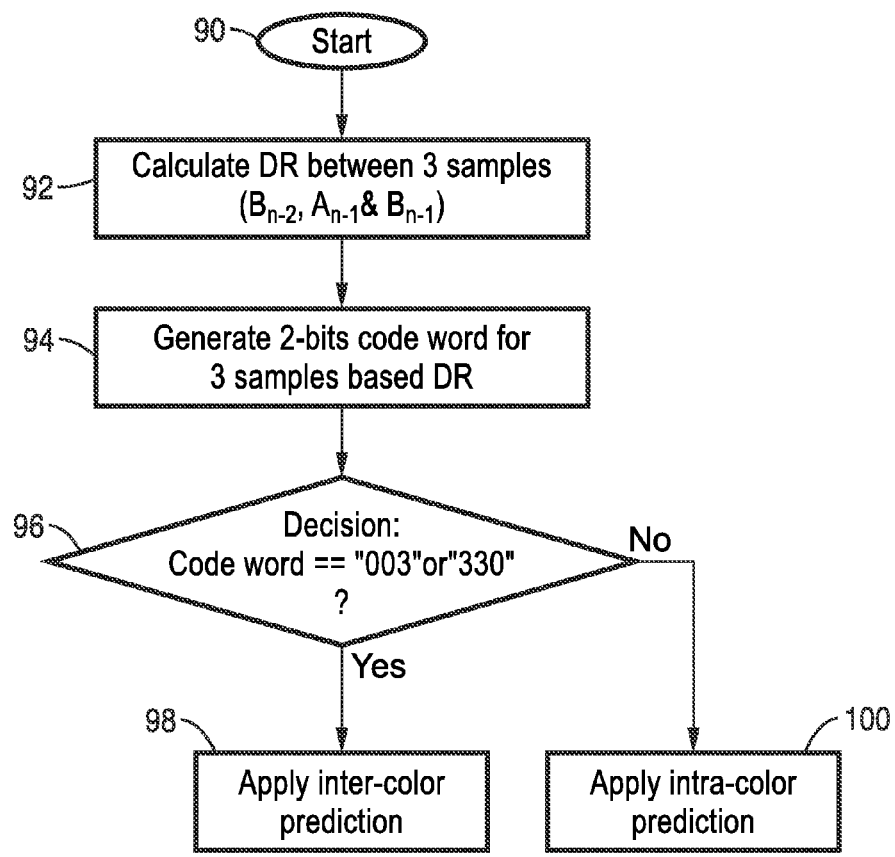
FIG. 8 is a flow diagram showing the use of a first dynamic range (DR) decision for selecting whether to apply inter-color or intra-color prediction, according to an embodiment of the presented technology.

In FIG. 8 an example code word decision embodiment is shown. The process starts 90, and dynamic range is determined 92 between multiple samples, in this example using the last three samples (=$B_{n-2}$, $A_{n-1}$ and $B_{n-1}$). Resolution of each sample is reduced 94 such as to having only two bits (a two-bits value). A decision is then made 96 if this code word is an intra-color exception case, such as equal to "003" or "330" for these examples, then inter (different) color prediction is applied 98 as $\Delta \Delta A_n = \Delta A_n - \Delta B_{n-1}$. If the code word is not an intra-color exception case, the residual is determined solely based on intra (same) color prediction 100 as $\Delta A_n = A_n - SP(A)$. Thus, based on the code word decision either $\Delta \Delta A_n$ or $\Delta A_n$ is utilized.

Figure 9:
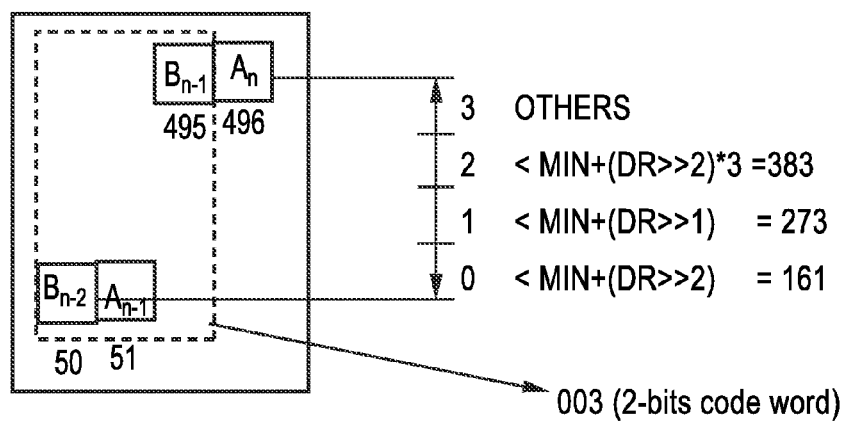
FIG. 9 is an example of pixel samples shown within a portion of a Bayer color image in which the decision in FIG. 8 to apply inter-color prediction is made, according to an embodiment of the presented technology.

In FIG. 9, an example of this decision is seen for a code word of "003". It will be recognized that in this example, each sample is coded to two bits with a value of from 0 to 3 for each sample of these three samples seen in the "003". Of these samples the largest value (prior to reduction of resolution to 2 bits) is 495 and the smallest is 50, wherein the dynamic range determination for these three samples (=$B_{n-2}$, $A_{n-1}$ and $B_{n-1}$) is seen below the pixel block as 495−50+1=446. As noted in the figure, MAX=495≥OTHERS≥"MIN+(DR>>2)*3=383.

Figure 10:
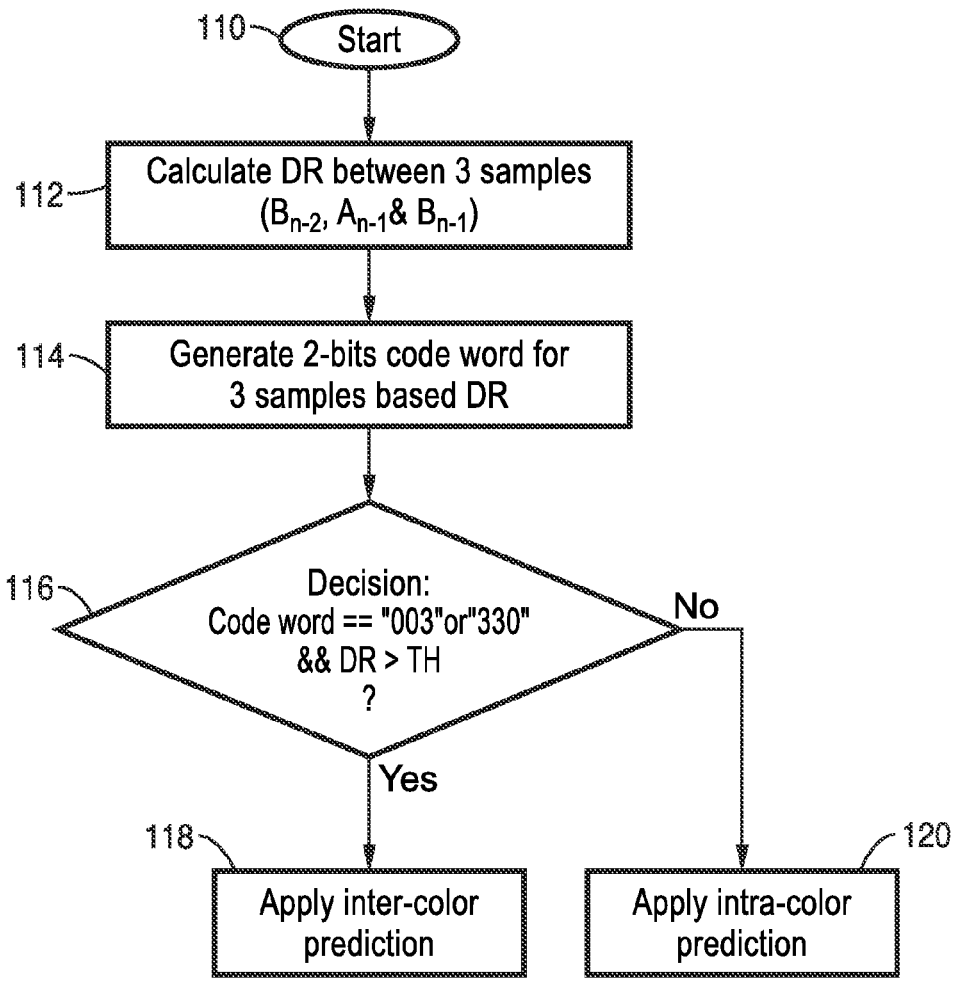
FIG. 10 is a flow diagram showing the use of a first dynamic range decision for selecting whether to apply inter-color or intra-color prediction as in FIG. 8, but the decision includes a dynamic range threshold condition, according to an embodiment of the presented technology.

In FIG. 10 a variant of that of FIG. 8 is seen which combines the dynamic range decision with a dynamic range exclusion. The process starts 110, dynamic range is determined 112 between multiple samples, in this example using the last three samples (=$B_{n-2}$, $A_{n-1}$ and $B_{n-1}$). Resolution of each sample is reduced 114 such as to having only two bits (a two-bits value). A decision is then made 116 if this code word is an intra-color exception case, such as equal to "003" or "330" for these examples, and if the dynamic range also exceeds a threshold (DR>TH), upon which (yes) inter (different) color prediction is applied 118 as $\Delta\Delta A_n = \Delta A_n - \Delta B_{n-1}$. If the decision conditions are not met (either code word is not equal to the exception case ("003", or "330") OR the dynamic range does not exceed a threshold condition), then the residual is determined solely based on intra (same) color prediction 120 as $\Delta A_n = A_n - SP(A)$. Thus, based on the code word decision, either $\Delta\Delta A_n$ or $\Delta A_n$ is utilized. By way of example and not limitation, a threshold of around 10 was used in cases of 10-bit and 14-bit input depth. In general, it will be appreciated that the threshold value should be set depending on image sensor characteristics, input bit depth and characteristics of the application.

Figure 11A:
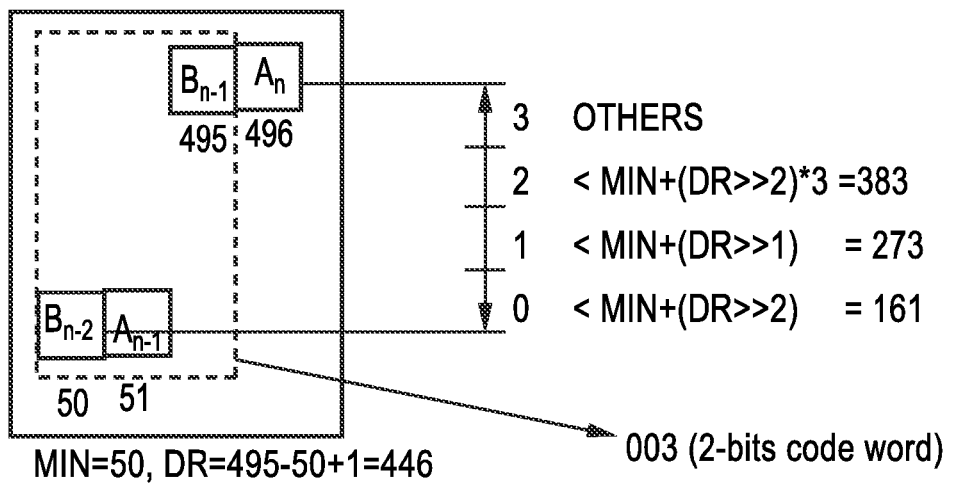
FIG. 11A and FIG. 11B are examples of pixel samples each shown within a portion of a Bayer color image in which the DR decision and exclusion in FIG. 10 to apply inter-color prediction is made, according to an embodiment of the presented technology.
Figure 11B:
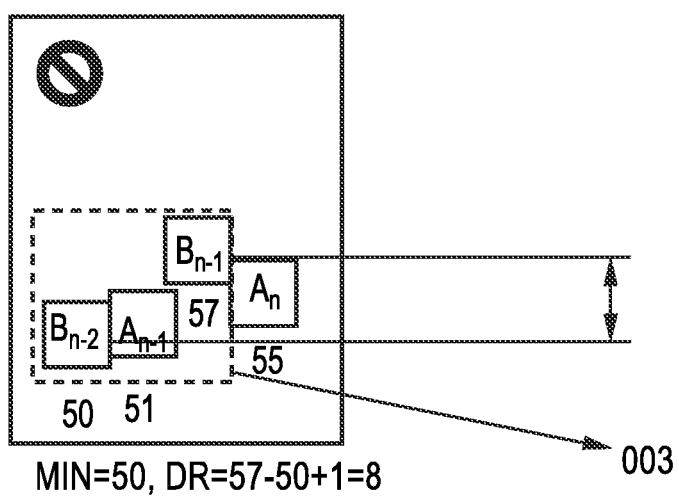

FIG. 11A shows an example of the above decision seen for a code word of "003", as was depicted in FIG. 8 and FIG. 10. In FIG. 11B, a dynamic range case is seen (DR=57−50+1=8) which does not exceed the threshold. Thus, even if the code word were "003" or "330", since the DR does not exceed the threshold then intra-color prediction was performed.

Figure 12:
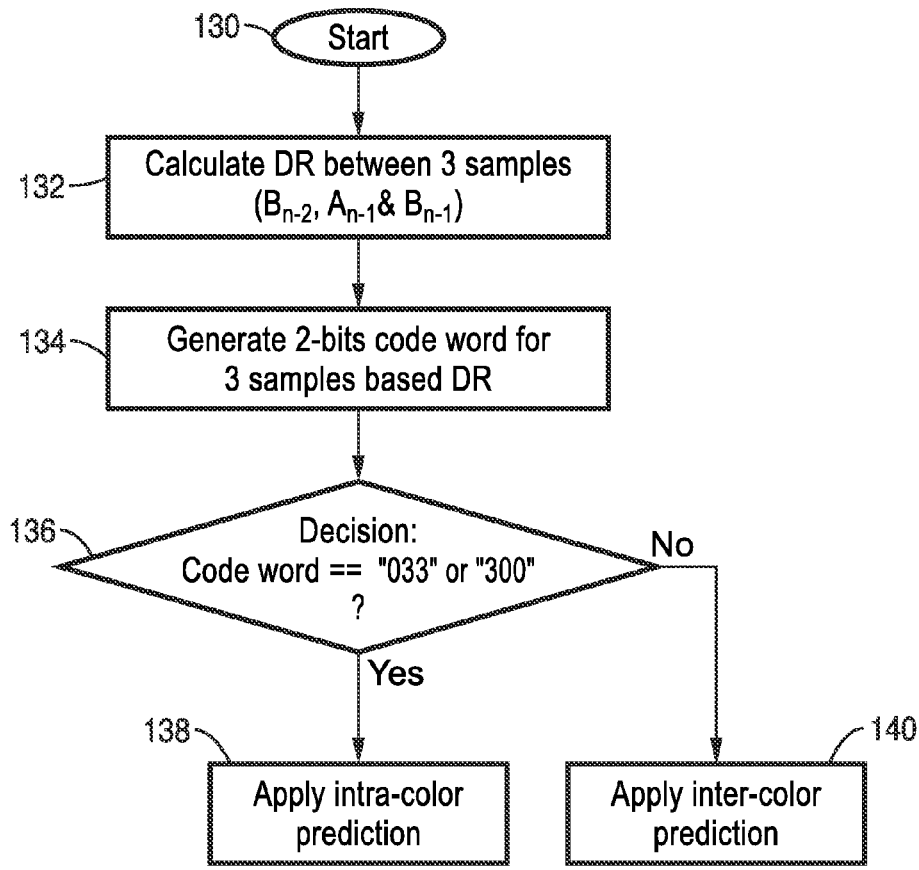
FIG. 12 is a flow diagram showing the use of a second dynamic range decision for selecting whether to apply inter-color or intra-color prediction, according to an embodiment of the presented technology.

In FIG. 12 is seen an alternate example to FIG. 8, in which a different code word decision is made in the opposing direction. The process starts 130, and dynamic range is determined 132 between multiple samples, in this example using the last three samples (=$B_{n-2}$, $A_{n-1}$ and $B_{n-1}$). Resolution of each sample is reduced 134 such as to having only two bits (a two-bits value). A decision is then made 136 if this code word is an inter-color exception case (not an intra-color exception as in FIG. 8), such as equal to "033" or "300" (it was "003", "330" in FIG. 8) in this example, then intra (same) color prediction is applied 138 as $\Delta A_n = A_n - SP(A)$. If the code word is not an inter-color exception case, then the residual is determined solely based on inter (different) color prediction 140 as $\Delta\Delta A_n = \Delta A_n - \Delta B_{n-1}$. Thus, based on the code word decision either $\Delta\Delta A_n$ or $\Delta A_n$ is utilized.

Figure 13:
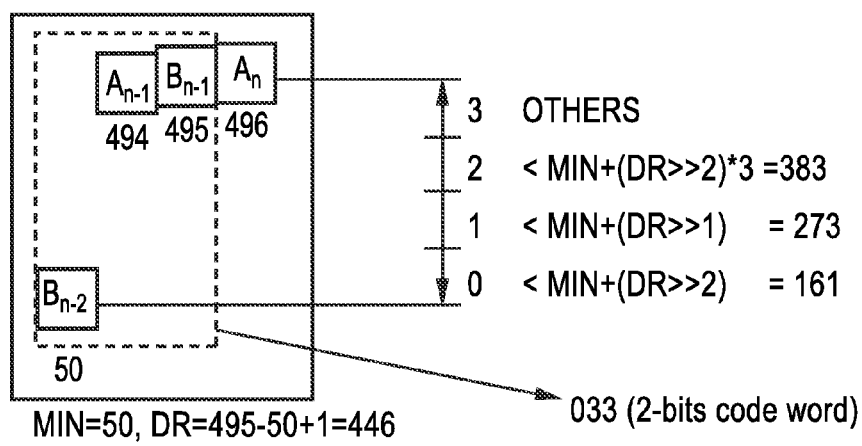
FIG. 13 is an example of pixel samples shown within a portion of a Bayer color image in which the decision in FIG. 12 to apply inter-color prediction is made, according to an embodiment of the presented technology.

In FIG. 13 an example of the above code word dynamic range decision for a code word of "033". Of these samples the largest value is 495 and the smallest is 50, wherein the dynamic range determination for these three samples (=$B_{n-2}$, $A_{n-1}$ and $B_{n-1}$) is seen below the pixel block as 495−50+1=446. As noted in the figure, MAX=495≥OTHERS≥"MIN+(DR>>2)*3=383.

Figure 14:
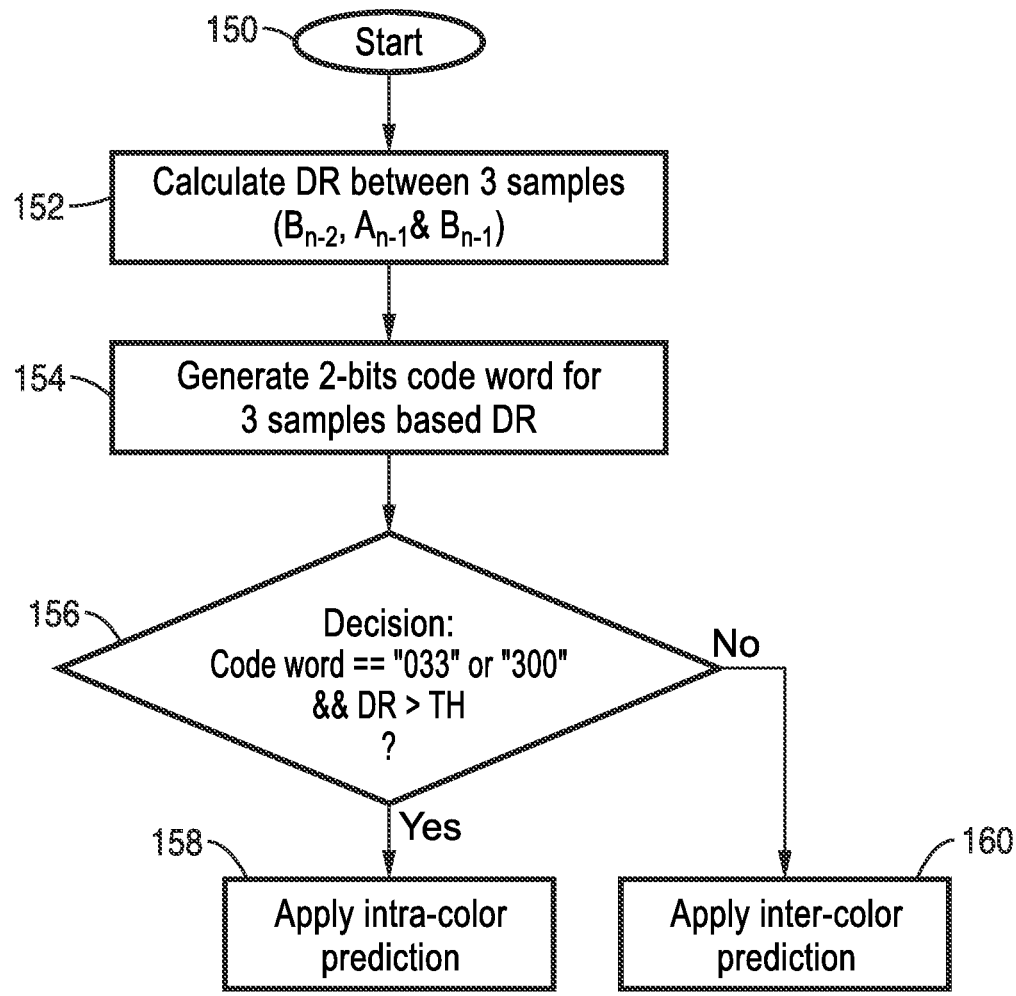
FIG. 14 is a flow diagram showing the use of a second dynamic range decision for selecting whether to apply inter-color or intra-color prediction as in FIG. 12, but including a dynamic range threshold condition, according to an embodiment of the presented technology.

FIG. 14 shows a variant of the embodiment shown FIG. 12 where the dynamic range decision is combined with a dynamic range exclusion. The process starts 150, dynamic range is determined 152 between multiple samples, in this example using the last three samples (=$B_{n-2}$, $A_{n-1}$ and $B_{n-1}$). Resolution of each sample is reduced 154 such as to having only two bits (a two-bits value). A decision is then made 156 if this code word is an inter-color exception case, such as equal to "033" or "300" for these examples, and if the dynamic range exceeds a threshold (DR>TH), upon which (yes) intra (same) color prediction is applied 158 as $\Delta A_n = A_n - SP(A)$. If the decision conditions are not met (either code word is not equal to the exception case ("033", or "300") OR the dynamic range does not exceed a threshold condition), then the residual is determined solely based on inter (different) color prediction 160 as $\Delta\Delta A_n = \Delta A_n - \Delta B_{n-1}$. Thus, based on the code word decision either $\Delta\Delta A_n$ or $\Delta A_n$ is utilized.

Figure 15A:
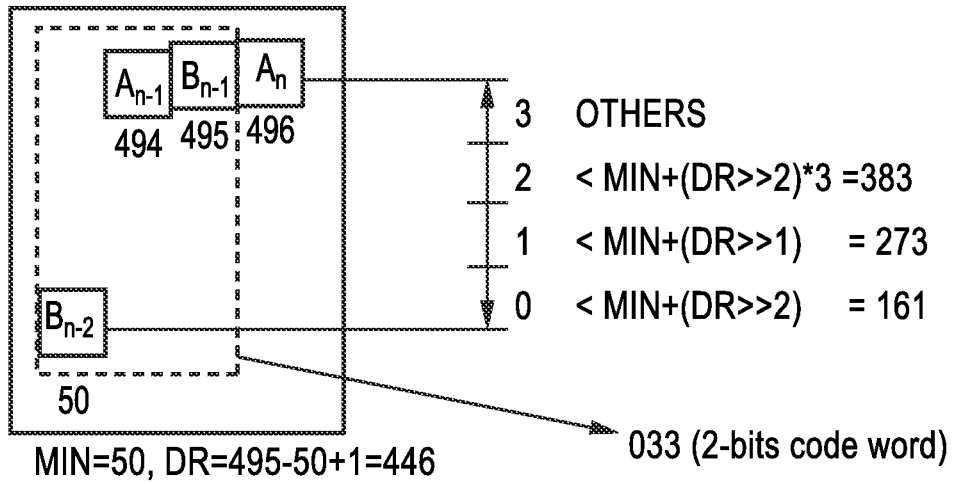
FIG. 15A and FIG. 15B are examples of pixel samples each shown within a portion of a Bayer color image in which the DR decision and exclusion in FIG. 14 to apply inter-color prediction is made, according to an embodiment of the presented technology.
Figure 15B:
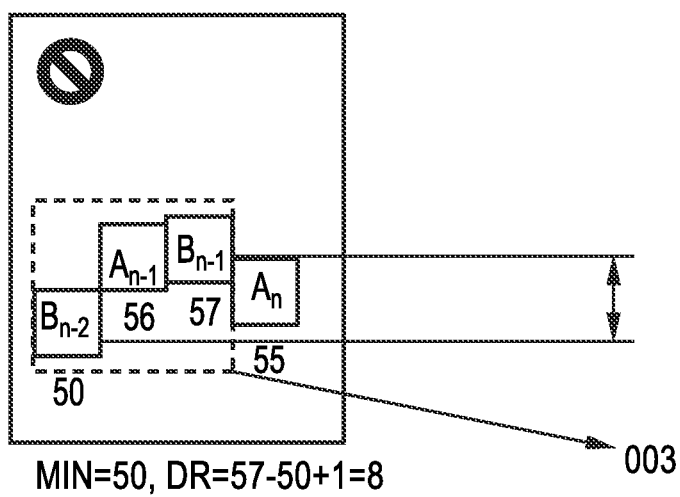

In FIG. 15A is an example of the above decision seen for a code word of "033", as was depicted in FIG. 12 and FIG. 14. In FIG. 15B, a dynamic range case is seen (DR=57−50+1=8) which does not exceed the threshold. Thus, even if the code word were "033" or "300", since the DR does not exceed the threshold then intra-color prediction was performed.

The present technology can be incorporated within encoder and decoder, such as for integration with various devices configured for Bayer color image capture (e.g., digital cameras, camcorders, and scanners), or in response to receiving color image information from an image capture device.

Embodiments of the present disclosure may be described with reference to flowchart illustrations of methods and systems according to embodiments of the disclosed technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for selecting prediction mode during Bayer encoding, comprising: (a) a computer processor configured for receiving color pixel data of an input Bayer image containing different color pixels associated with a plurality of different pixel group numbers; and (b) programming executable on the computer processor configured for performing steps comprising: (b)(i) determining dynamic range between multiple samples; (b)(ii) reducing sample resolution to a given number of bits; and (b)(iii) determining if a code word for said multiple samples is either (1) an intra-color exception case in which case inter-color prediction is selected, otherwise selecting intra-color prediction, or (2) an inter-color exception case in which case intra-color prediction is selected, otherwise selecting inter-color prediction.

2. The apparatus of any preceding embodiment, wherein for said programming executable on said computer, is further configured for qualifying said intra-color exception, or said inter-color exception case, by requiring that dynamic range between said multiple samples must also exceed a given threshold value.

3. The apparatus of any preceding embodiment, wherein said threshold value comprises a value of approximately ten.

4. The apparatus of any preceding embodiment, wherein three samples are utilized as said multiple samples.

5. The apparatus of any preceding embodiment, wherein said programming executable on the computer processor is configured for reducing sample resolution to two bits per sample.

6. The apparatus of any preceding embodiment, wherein said programming executable on the computer processor is configured for determining that an intra-color exception case exists if values for the three samples are in a group of values consisting of: "003", "330"; or that an inter-color exception case exists if values for the three samples are in a group of values consisting of: "033", and "300".

7. The apparatus of any preceding embodiment, wherein said programming executable on the computer processor is configured for performing said inter-color prediction, or said intra-color prediction in a process including quantization, computing a predictor, generating a residual and entropy coding the residual.

8. An apparatus for selecting prediction mode during Bayer encoding, comprising: (a) a computer processor configured for receiving color pixel data of an input Bayer image containing different color pixels associated with a plurality of different pixel group numbers; and (b) programming executable on the computer processor for performing steps comprising: (b)(i) determining dynamic range between multiple samples; (b)(ii) reducing sample resolution to two bits per sample, so that each sample is represented by a value from 0 to 3; (b)(iii) determining if a code word for said multiple samples is an intra-color exception case, or an inter-color exception case, in which sample values of said multiple samples consist of a combination of 0 and 3 values; (b)(iv) determining if dynamic range between said multiple samples exceeds a given threshold value; (b)(v) selecting inter-color prediction if an intra-color exception is determined and dynamic range exceeds the threshold, and selecting intra-color prediction otherwise, or selecting intra-color prediction if an inter-color exception is determined and dynamic range exceeds the threshold, and inter-color prediction otherwise.

9. The apparatus of any preceding embodiment, wherein said threshold value comprises a value of approximately ten.

10. The apparatus of any preceding embodiment, wherein three samples are utilized as said multiple samples.

11. The apparatus of any preceding embodiment, wherein said programming executable on the computer processor is configured determining that an intra-color exception case exists if the values for the three samples are in a group of values consisting of "003", "330"; or that an inter-color exception case exists if values for the three samples are in a group of values consisting of: "033", and "300".

12. The apparatus of any preceding embodiment, wherein said programming executable on the computer processor is configured for performing said inter-color prediction, or said intra-color prediction in a process including quantization, computing a predictor, generating a residual and entropy coding the residual.

13. A method of selecting prediction mode during Bayer encoding, comprising: (a) receiving color pixel data of an input Bayer image containing different color pixels associated with a plurality of different pixel group numbers in an electronic image processing device; (b) determining dynamic range between multiple samples; (c) reducing sample resolution to a given number of bits; and (d) determining if a code word for said multiple samples is either (1) an intra-color exception case in which inter-color prediction is selected, otherwise intra-color prediction is selected, or (2) an inter-color exception case in which case intra-color prediction is selected, otherwise selecting inter-color prediction.

14. The method of any preceding embodiment, further comprising qualifying said intra-color exception case and/or said inter-color exception case by requiring that dynamic range between said multiple samples must also exceed a given threshold value.

15. The method of any preceding embodiment, wherein said threshold value comprises a value of approximately ten.

16. The method of any preceding embodiment, wherein three samples are utilized as said multiple samples.

17. The method of any preceding embodiment, wherein said samples are reduced to two bits per sample of resolution.

18. The method of any preceding embodiment, wherein said intra-color exception case exists if values for the three samples are in the group of values consisting of "003", "330"; or that an inter-color exception case exists if values for the three samples are in a group of values consisting of: "033", and "300".

19. The method of any preceding embodiment, wherein said electronic image processing device is configured for performing said inter-color prediction, or said intra-color prediction in a process including quantization, computing a predictor, generating a residual and entropy coding the residual.

20. The method of any preceding embodiment, wherein said electronic image processing device is configured for receiving said input Bayer image as captured from a camera device, or said electronic image processing device is a camera device capturing said input Bayer image.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for selecting color prediction mode during Bayer encoding, comprising:
   (a) a computer processor configured for receiving color pixel data of an input Bayer image containing different color pixels associated with a plurality of different pixel group numbers; and
   (b) programming executable on the computer processor configured for performing steps comprising:
      (i) determining dynamic range between a selection of multiple samples to determine if a large spatial edge exists;
      (ii) reducing sample resolution to a given number of bits in a reduced sample resolution as a code word for said multiple samples; and
      (iii) determining if said code word for said multiple samples at the reduced sample resolution is either (1) an intra-color exception case in which case inter-color prediction is selected, otherwise selecting intra-color prediction, or (2) an inter-color exception case in which case intra-color prediction is selected, otherwise selecting inter-color prediction.

2. The apparatus recited in claim 1, wherein said programming executable on said computer, is further configured for qualifying said intra-color exception case, or said inter-color exception case, by requiring that dynamic range between said multiple samples must also exceed a given threshold value.

3. The apparatus recited in claim 2, wherein said threshold value comprises a value of ten.

4. The apparatus recited in claim 1, wherein three samples are utilized as said multiple samples.

5. The apparatus recited in claim 1, wherein said programming executable on the computer processor is configured for reducing sample resolution to two bits per sample.

6. The apparatus recited in claim 5, wherein said programming executable on the computer processor is configured for determining that an intra-color exception case exists if values for the three samples are in a group of values consisting of: "003", "330"; or that an inter-color exception case exists if values for the three samples are in a group of values consisting of: "033", and "300".

7. The apparatus recited in claim 1, wherein said programming executable on the computer processor is configured for performing said inter-color prediction, or said intra-color prediction in a process including quantization, computing a predictor, generating a residual and entropy coding the residual.

8. An apparatus for selecting color prediction mode during Bayer encoding, comprising:
   (a) a computer processor configured for receiving color pixel data of an input Bayer image containing different color pixels associated with a plurality of different pixel group numbers; and
   (b) programming executable on the computer processor for performing steps comprising:
      (i) determining dynamic range between a selection of multiple samples determine if a large spatial edge exists;
      (ii) reducing sample resolution to two bits per sample in a reduced sample resolution as a code word for said multiple samples, so that each sample is represented by a value from 0 to 3;
      (iii) determining if said code word for said multiple samples at the reduced sample resolution is an intra-color exception case, or an inter-color exception case, in which sample values of said multiple samples consist of a combination of 0 and 3 values;
      (iv) determining if dynamic range between said multiple samples exceeds a given threshold value; and
      (v) selecting inter-color prediction if an intra-color exception is determined and dynamic range exceeds the threshold, and selecting intra-color prediction otherwise, or selecting intra-color prediction if an inter-color exception is determined and dynamic range exceeds the threshold, and inter-color prediction otherwise.

9. The apparatus recited in claim 8, wherein said threshold value comprises a value of ten.

10. The apparatus recited in claim 8, wherein three samples are utilized as said multiple samples.

11. The apparatus recited in claim 8, wherein said programming executable on the computer processor is configured for determining that an intra-color exception case exists if the values for the three samples are in a group of values consisting of "003", "330"; or that an inter-color exception case exists if values for the three samples are in a group of values consisting of: "033", and "300".

12. The apparatus recited in claim 8, wherein said programming executable on the computer processor is configured for performing said inter-color prediction, or said intra-color prediction in a process including quantization, computing a predictor, generating a residual and entropy coding the residual.

13. A method of selecting color prediction mode during Bayer encoding, comprising:
   (a) receiving color pixel data of an input Bayer image containing different color pixels associated with a plurality of different pixel group numbers in an electronic image processing device;
   (b) determining dynamic range between a selection of multiple samples to determine if a large spatial edge exists;
   (c) reducing sample resolution to a given number of bits in a reduced sample resolution as a code word for said multiple samples; and (d) determining if said code word for said multiple samples at the reduced sample resolution is either (1) an intra-color exception case in which inter-color prediction is selected, otherwise intra-color prediction is selected, or (2) an inter-color exception case in which case intra-color prediction is selected, otherwise selecting inter-color prediction.

14. The method recited in claim 13, further comprising qualifying said intra-color exception case and/or said inter-color exception case, by requiring that dynamic range between said multiple samples must also exceed a given threshold value.

15. The method recited in claim 14, wherein said threshold value comprises a value of ten.

16. The method recited in claim 13, wherein three samples are utilized as said multiple samples.

17. The method recited in claim 13, wherein said samples are reduced to two bits per sample of resolution.

18. The method recited in claim 17, wherein said intra-color exception case exists if values for the three samples are in the group of values consisting of "003", "330"; or that an inter-color exception case exists if values for the three samples are in a group of values consisting of: "033", and "300".

19. The method recited in claim 13, wherein said electronic image processing device is configured for performing said inter-color prediction, or said intra-color prediction in a process including quantization, computing a predictor, generating a residual and entropy coding the residual.

20. The method recited in claim 13, wherein said electronic image processing device is configured for receiving said input Bayer image as captured from a camera device, or said electronic image processing device is a camera device capturing said input Bayer image.

* * * * *